(12) United States Patent
Hardy et al.

(10) Patent No.: US 8,016,668 B2
(45) Date of Patent: Sep. 13, 2011

(54) METHOD AND SYSTEM FOR REMOTE ENTRY IN FREQUENT PLAYER PROGRAMS

(75) Inventors: Dow Hardy, Marlborough, MA (US); Mark E. Herrmann, Wellesley, MA (US); Steven N. Kane, Brookline, MA (US)

(73) Assignee: GameLogic Inc., Waltham, MA (US)

( * ) Notice: Subject to any disclaimer, the term of this patent is extended or adjusted under 35 U.S.C. 154(b) by 12 days.

(21) Appl. No.: 11/704,144

(22) Filed: Feb. 8, 2007

(65) Prior Publication Data
US 2007/0254736 A1   Nov. 1, 2007

Related U.S. Application Data

(60) Provisional application No. 60/771,505, filed on Feb. 8, 2006, provisional application No. 60/838,234, filed on Aug. 17, 2006.

(51) Int. Cl.
*A63F 13/12* (2006.01)
(52) U.S. Cl. ............... 463/29; 463/25; 463/42; 273/460; 705/14.12; 709/203
(58) Field of Classification Search ............... 463/16–23, 463/25–29, 30–33, 39–43, 45, 47; 273/138.1, 273/139, 138.2, 141 A, 454–456, 460; 709/203–207; 713/1, 100, 150, 182, 187–189, 300, 375, 713/400, 500, 600; 705/14, 14.1, 14.11–14.14
See application file for complete search history.

(56) References Cited

U.S. PATENT DOCUMENTS

| | | | |
|---|---|---|---|
| 2,544,961 A | 3/1951 | Leonard |
| 4,215,864 A | 8/1980 | Nichols |
| 4,494,197 A | 1/1985 | Troy et al. |
| 4,582,324 A | 4/1986 | Koza et al. |
| 4,679,789 A | 7/1987 | Okada |
| 4,689,742 A | 8/1987 | Troy et al. |
| 4,725,079 A | 2/1988 | Koza et al. |
| 4,764,666 A | 8/1988 | Bergeron |

(Continued)

FOREIGN PATENT DOCUMENTS

EP   1746550 A2   1/2007

(Continued)

OTHER PUBLICATIONS

Rules of Pai Gow Poker. Casino City. Dec. 3, 2000. Online: http://web.archive.org/web/20001203170300/http://www.casinocity.com/rule/paigow.htm.

(Continued)

*Primary Examiner* — Arthur O. Hall
(74) *Attorney, Agent, or Firm* — Dority & Manning, P.A.

(57) ABSTRACT

The field of the invention relates generally to casino frequent player programs, and more specifically to providing special incentives for remote entry of casino affiliation or membership cards. The special incentives may include providing a prize or award to frequent player program members that remotely use his or her membership. The member may or may not be told of any winnings upon entry. In one example, the player is provided an indication of winning an incentive during play of an online game. In another example, the player may be required to obtain the winnings at the casino to encourage players to return to the casino. Also, the player may be required to redeem any winnings within a specified period of time. Further, the player incentives may be offered periodically, encouraging the player to periodically check their status remotely.

33 Claims, 6 Drawing Sheets

U.S. PATENT DOCUMENTS

| | | | |
|---|---|---|---|
| 4,856,787 A | 8/1989 | Itkis | |
| 4,882,473 A | 11/1989 | Bergeron et al. | |
| 4,922,522 A | 5/1990 | Scanlon | |
| 5,158,293 A | 10/1992 | Mullins | |
| 5,179,517 A * | 1/1993 | Sarbin et al. | 463/25 |
| 5,324,035 A | 6/1994 | Morris et al. | |
| 5,326,104 A * | 7/1994 | Pease et al. | 463/18 |
| 5,351,970 A | 10/1994 | Fioretti | |
| 5,373,440 A | 12/1994 | Cohen | |
| 5,377,975 A | 1/1995 | Clapper, Jr. | |
| 5,398,932 A | 3/1995 | Eberhardt et al. | |
| 5,429,361 A | 7/1995 | Raven | |
| 5,445,391 A | 8/1995 | Gleason, Jr. | |
| 5,518,253 A | 5/1996 | Pocock et al. | |
| 5,569,082 A | 10/1996 | Kaye | |
| 5,586,937 A | 12/1996 | Menashe | |
| 5,611,729 A | 3/1997 | Schumacher | |
| 5,628,684 A | 5/1997 | Bouedec | |
| 5,645,485 A | 7/1997 | Clapper, Jr. | |
| 5,653,635 A | 8/1997 | Breeding | |
| 5,687,971 A | 11/1997 | Khaladkar | |
| 5,709,603 A | 1/1998 | Kaye | |
| 5,722,891 A | 3/1998 | Inoue | |
| 5,749,784 A | 5/1998 | Clapper, Jr. | |
| 5,768,382 A | 6/1998 | Schneier et al. | |
| 5,772,511 A | 6/1998 | Smeltzer | |
| 5,775,993 A | 7/1998 | Fentz | |
| 5,779,549 A | 7/1998 | Walker et al. | |
| 5,788,573 A | 8/1998 | Baerlocher et al. | |
| 5,791,990 A | 8/1998 | Schroeder et al. | |
| 5,791,991 A | 8/1998 | Small | |
| 5,797,795 A | 8/1998 | Takemoto | |
| 5,810,664 A | 9/1998 | Clapper, Jr. | |
| 5,816,918 A | 10/1998 | Kelly et al. | |
| 5,823,873 A | 10/1998 | Moody | |
| 5,823,874 A | 10/1998 | Adams | |
| 5,830,069 A | 11/1998 | Soltesz et al. | |
| 5,848,932 A | 12/1998 | Adams | |
| 5,851,010 A * | 12/1998 | Feinberg | 273/274 |
| 5,860,653 A | 1/1999 | Jacobs | |
| 5,871,398 A | 2/1999 | Schneier et al. | |
| 5,882,258 A | 3/1999 | Kelly et al. | |
| 5,887,906 A | 3/1999 | Sultan | |
| 5,928,082 A | 7/1999 | Clapper, Jr. et al. | |
| 5,944,606 A | 8/1999 | Gerow | |
| 5,954,582 A | 9/1999 | Zach et al. | |
| 5,967,896 A * | 10/1999 | Jorasch et al. | 463/25 |
| 5,980,385 A | 11/1999 | Clapper | |
| 5,996,997 A | 12/1999 | Kamille | |
| 6,007,426 A | 12/1999 | Kelly et al. | |
| 6,012,983 A | 1/2000 | Walker et al. | |
| 6,015,344 A | 1/2000 | Kelly et al. | |
| 6,024,640 A | 2/2000 | Walker et al. | |
| 6,028,920 A | 2/2000 | Carson | |
| 6,044,135 A | 3/2000 | Katz | |
| 6,048,269 A | 4/2000 | Burns et al. | |
| 6,056,289 A | 5/2000 | Clapper | |
| 6,059,289 A | 5/2000 | Vancura | |
| 6,077,163 A | 6/2000 | Walker et al. | |
| 6,106,393 A | 8/2000 | Sunaga et al. | |
| 6,113,495 A | 9/2000 | Walker et al. | |
| 6,146,272 A | 11/2000 | Walker et al. | |
| 6,152,823 A | 11/2000 | Lacoste et al. | |
| 6,159,097 A | 12/2000 | Gura | |
| 6,162,121 A | 12/2000 | Morro et al. | |
| 6,168,521 B1 | 1/2001 | Luciano et al. | |
| 6,173,267 B1 | 1/2001 | Cairns | |
| 6,179,710 B1 * | 1/2001 | Sawyer et al. | 463/16 |
| 6,179,711 B1 | 1/2001 | Yoseloff | |
| 6,186,892 B1 | 2/2001 | Frank et al. | |
| 6,193,608 B1 * | 2/2001 | Walker et al. | 463/25 |
| 6,203,011 B1 | 3/2001 | Nulph et al. | |
| 6,203,427 B1 | 3/2001 | Walker et al. | |
| 6,236,900 B1 | 5/2001 | Geiger | |
| 6,241,606 B1 | 6/2001 | Riendeau et al. | |
| 6,244,958 B1 | 6/2001 | Acres et al. | |
| 6,251,017 B1 | 6/2001 | Leason et al. | |
| 6,270,406 B1 | 8/2001 | Sultan | |
| 6,273,817 B1 | 8/2001 | Sultan | |
| 6,279,911 B1 | 8/2001 | Cherry | |
| 6,280,325 B1 | 8/2001 | Fisk | |
| RE37,371 E | 9/2001 | Gerow | |
| 6,283,855 B1 | 9/2001 | Bingham | |
| 6,287,197 B1 | 9/2001 | Dickinson | |
| 6,302,793 B1 | 10/2001 | Fertitta et al. | |
| 6,309,298 B1 | 10/2001 | Gerow | |
| 6,311,976 B1 | 11/2001 | Yoseloff et al. | |
| 6,312,334 B1 | 11/2001 | Yoseloff | |
| 6,358,151 B1 | 3/2002 | Enzminger et al. | |
| 6,364,765 B1 | 4/2002 | Walker et al. | |
| 6,364,766 B1 | 4/2002 | Anderson | |
| 6,368,214 B1 | 4/2002 | Luciano | |
| 6,368,218 B2 | 4/2002 | Angell, Jr. | |
| 6,371,852 B1 * | 4/2002 | Acres | 463/25 |
| 6,375,567 B1 | 4/2002 | Acres | |
| 6,377,669 B1 * | 4/2002 | Walker et al. | 379/144.05 |
| 6,390,921 B1 | 5/2002 | Busch et al. | |
| 6,394,902 B1 | 5/2002 | Glavich et al. | |
| 6,402,614 B1 | 6/2002 | Schneier et al. | |
| 6,439,995 B1 | 8/2002 | Hughs-Baird et al. | |
| 6,471,208 B2 | 10/2002 | Yoseloff et al. | |
| 6,488,280 B1 | 12/2002 | Katz et al. | |
| 6,500,066 B1 * | 12/2002 | Bower et al. | 463/20 |
| 6,508,709 B1 * | 1/2003 | Karmarkar | 463/42 |
| 6,511,377 B1 * | 1/2003 | Weiss | 463/25 |
| 6,514,144 B2 | 2/2003 | Riendeau et al. | |
| 6,523,829 B1 | 2/2003 | Walker et al. | |
| 6,527,175 B1 | 3/2003 | Dietz et al. | |
| 6,540,230 B1 | 4/2003 | Walker et al. | |
| 6,565,084 B1 | 5/2003 | Katz et al. | |
| 6,572,106 B2 | 6/2003 | Alexoff et al. | |
| 6,572,107 B1 | 6/2003 | Walker et al. | |
| 6,575,832 B1 | 6/2003 | Manfredi et al. | |
| 6,582,307 B2 | 6/2003 | Webb | |
| 6,582,310 B1 | 6/2003 | Walker et al. | |
| 6,588,747 B1 | 7/2003 | Seelig | |
| 6,595,854 B2 | 7/2003 | Hughs-Baird | |
| 6,599,187 B2 | 7/2003 | Gerow | |
| 6,599,192 B1 | 7/2003 | Baerlocher et al. | |
| 6,607,439 B2 | 8/2003 | Schneier et al. | |
| 6,612,501 B1 | 9/2003 | Woll et al. | |
| 6,612,574 B1 | 9/2003 | Cole et al. | |
| 6,619,660 B2 | 9/2003 | Schaefer et al. | |
| 6,620,046 B2 | 9/2003 | Rowe | |
| 6,625,578 B2 | 9/2003 | Spaur et al. | |
| 6,645,074 B2 | 11/2003 | Thomas et al. | |
| 6,645,075 B1 | 11/2003 | Gatto | |
| 6,656,042 B2 | 12/2003 | Reiss et al. | |
| 6,663,105 B1 | 12/2003 | Sullivan et al. | |
| 6,676,126 B1 | 1/2004 | Walker et al. | |
| 6,679,497 B2 | 1/2004 | Walker et al. | |
| 6,681,995 B2 | 1/2004 | Sukeda et al. | |
| 6,682,419 B2 | 1/2004 | Webb et al. | |
| D486,869 S | 2/2004 | Webb et al. | |
| 6,685,561 B2 | 2/2004 | Anderson et al. | |
| 6,692,353 B2 | 2/2004 | Walker et al. | |
| 6,705,944 B2 | 3/2004 | Luciano | |
| 6,716,103 B1 | 4/2004 | Eck et al. | |
| 6,719,631 B1 | 4/2004 | Tulley et al. | |
| 6,729,956 B2 | 5/2004 | Wolf et al. | |
| 6,733,385 B1 | 5/2004 | Enzminger et al. | |
| 6,736,324 B2 | 5/2004 | Behm | |
| 6,749,198 B2 | 6/2004 | Katz et al. | |
| 6,761,633 B2 | 7/2004 | Riendeau et al. | |
| 6,786,824 B2 * | 9/2004 | Cannon | 463/42 |
| 6,800,030 B2 * | 10/2004 | Acres | 463/25 |
| 6,811,484 B2 | 11/2004 | Katz et al. | |
| 6,824,467 B2 | 11/2004 | Schlottmann et al. | |
| 6,843,724 B2 | 1/2005 | Walker et al. | |
| 6,852,031 B1 | 2/2005 | Rowe et al. | |
| 6,855,052 B2 | 2/2005 | Weiss et al. | |
| 6,896,619 B2 | 5/2005 | Baltz | |
| 6,899,622 B2 | 5/2005 | Lind et al. | |
| 6,910,968 B2 | 6/2005 | Nassef et al. | |
| 6,913,534 B2 | 7/2005 | DeFrees-Parrott | |
| 6,918,589 B2 | 7/2005 | Thibault | |
| 6,929,544 B2 | 8/2005 | Osterer | |

| | | |
|---|---|---|
| 6,934,846 B2 | 8/2005 | Szrek |
| 6,942,570 B2 | 9/2005 | Schneier et al. |
| 6,965,868 B1 * | 11/2005 | Bednarek ............... 705/9 |
| 6,969,319 B2 | 11/2005 | Rowe et al. |
| 7,008,317 B2 | 3/2006 | Cote et al. |
| 7,008,318 B2 | 3/2006 | Schneier et al. |
| 7,024,375 B2 | 4/2006 | Chau |
| 7,052,394 B2 | 5/2006 | Walker et al. |
| 7,073,720 B2 | 7/2006 | Behm |
| 7,094,149 B2 | 8/2006 | Walker |
| 7,094,154 B2 * | 8/2006 | Kellerman et al. ........ 463/42 |
| 7,112,135 B2 | 9/2006 | Anderson |
| 7,118,478 B2 | 10/2006 | Fayter et al. |
| 7,163,459 B2 | 1/2007 | Tanskanen et al. |
| 7,172,506 B2 | 2/2007 | Baerlocher et al. |
| 7,179,168 B1 | 2/2007 | Tulley et al. |
| 7,186,180 B2 | 3/2007 | Lathrop |
| 7,213,811 B2 | 5/2007 | Bozeman |
| 7,241,219 B2 | 7/2007 | Walker |
| 7,275,990 B2 | 10/2007 | Walker et al. |
| 7,285,045 B2 | 10/2007 | Schneier et al. |
| 7,294,058 B1 | 11/2007 | Slomiany et al. |
| 7,303,468 B2 | 12/2007 | Schneier et al. |
| 7,303,470 B2 | 12/2007 | George et al. |
| 7,311,599 B2 | 12/2007 | Knapp |
| 7,335,106 B2 * | 2/2008 | Johnson ............... 463/42 |
| 7,341,516 B2 * | 3/2008 | Dabrowski ............ 463/25 |
| 7,357,393 B2 | 4/2008 | Finocchio |
| 7,416,484 B1 | 8/2008 | Nelson |
| 7,424,617 B2 * | 9/2008 | Boyd et al. .............. 713/176 |
| 7,682,244 B1 * | 3/2010 | Luciano et al. ........... 463/25 |
| 7,699,706 B2 * | 4/2010 | Walker et al. ........... 463/42 |
| 7,722,466 B2 * | 5/2010 | Rothschild ............ 463/42 |
| 7,753,770 B2 * | 7/2010 | Walker et al. ........... 463/16 |
| 7,785,193 B2 * | 8/2010 | Paulsen et al. .......... 463/25 |
| 7,815,502 B2 * | 10/2010 | Hardy et al. ............ 463/16 |
| 7,918,738 B2 * | 4/2011 | Paulsen .............. 463/43 |
| 2001/0029464 A1 | 10/2001 | Schweitzwer .......... 705/14 |
| 2001/0034635 A1 | 10/2001 | Winters |
| 2001/0046891 A1 | 11/2001 | Acres |
| 2001/0049305 A1 | 12/2001 | Riendeau et al. |
| 2002/0010015 A1 | 1/2002 | Acres |
| 2002/0013167 A1 | 1/2002 | Spaur et al. |
| 2002/0039923 A1 | 4/2002 | Cannon et al. |
| 2002/0042300 A2 | 4/2002 | Acres et al. |
| 2002/0052229 A1 | 5/2002 | Halliburton et al. |
| 2002/0061778 A1 | 5/2002 | Acres |
| 2002/0077173 A1 | 6/2002 | Luciano et al. |
| 2002/0090986 A1 | 7/2002 | Cote et al. |
| 2002/0090987 A1 | 7/2002 | Walker et al. |
| 2002/0093190 A1 | 7/2002 | Katz |
| 2002/0094869 A1 * | 7/2002 | Harkham ............. 463/42 |
| 2002/0098882 A1 | 7/2002 | Lind et al. |
| 2002/0107072 A1 | 8/2002 | Giobbi et al. |
| 2002/0142825 A1 * | 10/2002 | Lark et al. ............ 463/16 |
| 2002/0147040 A1 | 10/2002 | Walker et al. |
| 2002/0151359 A1 * | 10/2002 | Rowe ................ 463/29 |
| 2002/0152120 A1 | 10/2002 | Howington et al. |
| 2002/0155885 A1 | 10/2002 | Shvili |
| 2002/0169018 A1 | 11/2002 | Schneier et al. |
| 2002/0187827 A1 | 12/2002 | Blankstein |
| 2002/0193158 A1 | 12/2002 | Weiss et al. |
| 2002/0198038 A1 | 12/2002 | Adams |
| 2003/0003983 A1 * | 1/2003 | Walker et al. ......... 463/16 |
| 2003/0013531 A1 | 1/2003 | Rowe et al. |
| 2003/0027628 A1 | 2/2003 | Luciano |
| 2003/0032473 A1 | 2/2003 | Rowe et al. |
| 2003/0032474 A1 * | 2/2003 | Kaminkow ........... 463/25 |
| 2003/0032476 A1 | 2/2003 | Walker et al. |
| 2003/0045340 A1 | 3/2003 | Roberts |
| 2003/0047869 A1 | 3/2003 | Walker et al. |
| 2003/0060257 A1 | 3/2003 | Katz et al. |
| 2003/0060261 A1 | 3/2003 | Katz et al. |
| 2003/0069068 A1 | 4/2003 | Kaminkow |
| 2003/0080508 A1 | 5/2003 | Thibault |
| 2003/0100362 A1 * | 5/2003 | Horniak et al. ......... 463/25 |
| 2003/0102625 A1 | 6/2003 | Katz et al. |
| 2003/0114217 A1 | 6/2003 | Walker et al. |
| 2003/0119581 A1 | 6/2003 | Cannon et al. |
| 2003/0139214 A1 | 7/2003 | Wolf et al. |
| 2003/0155715 A1 | 8/2003 | Walker et al. |
| 2003/0157977 A1 | 8/2003 | Thomas et al. |
| 2003/0171149 A1 * | 9/2003 | Rothschild ............ 463/42 |
| 2003/0171986 A1 | 9/2003 | Itkis |
| 2003/0176210 A1 | 9/2003 | Vancura et al. |
| 2003/0176212 A1 | 9/2003 | Schlottmann et al. |
| 2003/0184012 A1 | 10/2003 | Green |
| 2003/0186739 A1 | 10/2003 | Paulsen et al. |
| 2003/0195841 A1 | 10/2003 | Ginsberg et al. |
| 2003/0199318 A1 | 10/2003 | Nassef et al. |
| 2003/0218303 A1 | 11/2003 | Walker et al. |
| 2003/0220138 A1 | 11/2003 | Walker et al. |
| 2004/0025190 A1 | 2/2004 | McCalla et al. |
| 2004/0036212 A1 | 2/2004 | Walker et al. |
| 2004/0038723 A1 | 2/2004 | Schneier et al. |
| 2004/0051240 A1 | 3/2004 | Adams |
| 2004/0053683 A1 | 3/2004 | Hartl et al. |
| 2004/0059445 A1 | 3/2004 | Moore |
| 2004/0063484 A1 | 4/2004 | Dreaper et al. |
| 2004/0092307 A1 | 5/2004 | George et al. |
| 2004/0102238 A1 | 5/2004 | Taylor |
| 2004/0102239 A1 | 5/2004 | Samila |
| 2004/0127279 A1 | 7/2004 | Gatto et al. |
| 2004/0133472 A1 | 7/2004 | Leason et al. |
| 2004/0142741 A1 | 7/2004 | Walker et al. |
| 2004/0142750 A1 * | 7/2004 | Glisson et al. .......... 463/42 |
| 2004/0147308 A1 | 7/2004 | Walker et al. |
| 2004/0152504 A1 | 8/2004 | Herrmann et al. |
| 2004/0152510 A1 | 8/2004 | Herrmann |
| 2004/0180722 A1 | 9/2004 | Giobbi et al. |
| 2004/0185930 A1 | 9/2004 | Thomas et al. |
| 2004/0204222 A1 | 10/2004 | Roberts |
| 2004/0214622 A1 * | 10/2004 | Atkinson ............. 463/1 |
| 2004/0214628 A1 | 10/2004 | Boyd et al. |
| 2004/0229671 A1 | 11/2004 | Stronach et al. |
| 2004/0259629 A1 | 12/2004 | Michaelson et al. |
| 2004/0259631 A1 | 12/2004 | Katz et al. |
| 2005/0009601 A1 * | 1/2005 | Manfredi et al. ........ 463/29 |
| 2005/0037841 A1 | 2/2005 | de Waal |
| 2005/0049042 A1 | 3/2005 | Walker et al. |
| 2005/0054439 A1 * | 3/2005 | Rowe et al. ........... 463/29 |
| 2005/0075158 A1 | 4/2005 | Walker et al. |
| 2005/0090314 A1 | 4/2005 | Nassef, Jr. et al. |
| 2005/0092839 A1 | 5/2005 | Oram |
| 2005/0096126 A1 * | 5/2005 | Prasad et al. ......... 463/25 |
| 2005/0124407 A1 | 6/2005 | Rowe et al. |
| 2005/0164779 A1 | 7/2005 | Okuniewicz |
| 2005/0170881 A1 | 8/2005 | Muskin |
| 2005/0170883 A1 * | 8/2005 | Muskin .............. 463/25 |
| 2005/0187005 A1 | 8/2005 | Rose et al. |
| 2005/0258596 A1 | 11/2005 | Such |
| 2005/0261056 A1 * | 11/2005 | Smolucha ............ 463/25 |
| 2005/0282619 A1 | 12/2005 | Vancura et al. |
| 2005/0282626 A1 | 12/2005 | Manfredi et al. |
| 2005/0288088 A1 | 12/2005 | Englman et al. |
| 2006/0015405 A1 * | 1/2006 | Bala et al. ........... 705/14 |
| 2006/0025219 A1 | 2/2006 | Nassef, Jr. et al. |
| 2006/0035696 A1 | 2/2006 | Walker et al. |
| 2006/0036450 A1 | 2/2006 | Nassef, Jr. et al. |
| 2006/0041586 A1 | 2/2006 | Nassef, Jr. et al. |
| 2006/0068893 A1 | 3/2006 | Jaffe et al. |
| 2006/0073884 A1 | 4/2006 | Walker et al. |
| 2006/0089194 A1 | 4/2006 | Joshi et al. |
| 2006/0143085 A1 * | 6/2006 | Adams et al. .......... 705/14 |
| 2006/0148562 A1 | 7/2006 | Walker et al. |
| 2006/0194631 A1 | 8/2006 | Rowe et al. |
| 2006/0205511 A1 | 9/2006 | Thomas et al. |
| 2006/0247035 A1 | 11/2006 | Rowe et al. |
| 2007/0054729 A1 | 3/2007 | Hornik et al. |
| 2007/0060261 A1 | 3/2007 | Gomez et al. |
| 2007/0060274 A1 | 3/2007 | Rowe et al. |
| 2007/0060317 A1 | 3/2007 | Martin et al. |
| 2007/0060329 A1 | 3/2007 | Martin et al. |
| 2007/0060330 A1 | 3/2007 | Martin et al. |
| 2007/0060331 A1 | 3/2007 | Martin et al. |
| 2007/0060369 A1 | 3/2007 | Martin et al. |
| 2007/0087834 A1 | 4/2007 | Moser et al. |
| 2007/0167216 A1 | 7/2007 | Walker et al. |

| | | | |
|---|---|---|---|
| 2007/0173322 | A1 | 7/2007 | Swamy et al. |
| 2007/0265062 | A1 | 11/2007 | Thomas et al. |
| 2008/0032763 | A1 | 2/2008 | Giobbi et al. |
| 2008/0039171 | A1 | 2/2008 | Slomiany et al. |
| 2008/0039173 | A1 | 2/2008 | Walther et al. |
| 2008/0287176 | A1 | 11/2008 | Bennett |
| 2010/0056264 | A1* | 3/2010 | Jordan et al. ............ 463/25 |

FOREIGN PATENT DOCUMENTS

| | | |
|---|---|---|
| EP | 1762990 A2 | 3/2007 |
| EP | 1833014 A1 | 9/2007 |
| WO | WO 91/06931 | 5/1991 |
| WO | WO 97/37737 | 10/1997 |
| WO | WO 99/10057 | 3/1999 |
| WO | WO 99/16519 | 4/1999 |
| WO | WO 00/43087 | 7/2000 |
| WO | WO 00/69535 | 11/2000 |
| WO | WO 01/14029 | 3/2001 |
| WO | WO 03/004118 | 1/2003 |
| WO | WO 03/061795 | 7/2003 |
| WO | WO 03/084625 | 10/2003 |
| WO | WO 03/089077 | 10/2003 |
| WO | WO 03/089082 | 10/2003 |
| WO | WO 2004/013820 | 2/2004 |
| WO | 2004/105902 | 9/2004 |
| WO | WO 2004/114073 | 12/2004 |
| WO | WO 2005/029279 | 3/2005 |
| WO | WO 2005/031666 | 4/2005 |
| WO | WO 2005/079242 | 9/2005 |
| WO | WO 2006/028820 | 3/2006 |
| WO | WO 2006/052469 | 5/2006 |
| WO | WO 2007/035618 | 3/2007 |
| WO | WO 2007/040707 | 4/2007 |
| WO | WO 2007/076321 | 7/2007 |
| WO | WO 2007/145999 | 12/2007 |
| WO | WO 2008/014334 | 1/2008 |
| WO | WO 2008/022083 | 2/2008 |
| WO | WO 2008/022084 | 2/2008 |

OTHER PUBLICATIONS

H.X. Mel and Doris Baker, Cryptography Decrypted, 2001 Addison Wesly, chapters 9 to 12.

Virginia Lottery games, downloaded from www.archive.org, Apr. 29, 2007.

Pop Cap Games, Bejeweled, Feb. 3, 2005, http://web.archive.org/web/20050203202244/http://www.go2share.net/game/bejeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel_of_Fortune_%28US_game_show%29>.

New Jersey, State Of, "Wheel of Fortune" New Jersey Lottery, Nov. 13, 2007 <http://www.state.nj.us/lottery/instant/ig409.htm>.

New Jersey, State Of, "Lots O' Spots Bingo" New Jersey Lottery, Dec. 6, 2007 <http://www.state.nj.us/lottery/instant/ig340.htm>.

http://www.powerball.com/powerball/pb_howtoplay.asp, accessed Sep. 14, 2008, All.

Written opinion of the international searching authority (international application No. PCT/US07/76224).

Examiner's first report on patent application No. 2003298941.

Bejeweled Deluxe, Version 1.87, Release Date: May 30, 2001 Developed and published by PopCap Games, Inc., www.popcap.com, http://www.popcap.com/faq/bejeweled/1033/pc/readme.html (1of 8) Feb. 25, 2010 9:14:22 AM.

David, Matthew, Online Games Development in Flash—A Brief History, Apr. 28, 2003, SitePoint, http://articles.sitepoint.com/print/flash-brief-history (1 of 6) Jun. 18, 2010 8:28:50 AM.

* cited by examiner

METHOD AND SYSTEM FOR REMOTE ENTRY IN FREQUENT PLAYER PROGRAMS

RELATED APPLICATIONS

This application claims priority under 35 U.S.C. §119(e) to U.S. Provisional Application Ser. No. 60/771,505, entitled "METHOD AND SYSTEM FOR REMOTE ENTRY IN FREQUENT PLAYER PROGRAMS," filed on Feb. 8, 2006, and to U.S. Provisional Application Ser. No. 60/838,234, entitled "METHOD AND APPARATUS FOR CONDUCTING A GAME OF CHANCE," filed Aug. 17, 2006, both of which applications are incorporated herein by reference in their entirety.

FIELD OF THE INVENTION

The field of the invention relates generally to casino frequent player programs, and more specifically to providing special incentives for remote entry of casino affiliation or membership cards.

BACKGROUND

Numerous organizations and companies have incentive programs for customers. For example, airlines have frequent flyer programs that allow a member passenger to take free trips or provide other perks after the member has taken a minimum number of flights or has flown a minimum number of miles. Numerous other types of establishments, including hotel chains, chain stores, and movie rental companies, have similar programs used to incentivize a customer.

Casinos also often have similar frequent player programs that provide incentives for continued customer patronage. For instance, the Foxwoods Casino (Mashantucket, Conn.) offers a program referred to as Wampum Rewards. A player participating in the program receives a card which the player uses whenever he/she comes to the casino. In one example implementation, the player swipes the card at special kiosks located within the casino which permit that player to have a chance to win prizes. A Wampum Rewards member may also swipe his or her card whenever betting or spending money within the casino and in the associated hotel, resort, or shops. As the player bets or spends more money, the player becomes eligible for free or reduced cost perks. Other examples of frequent player programs used in the casino environment include the well-known Harrah's Total Rewards, Wynn Casino's Red Card, and Trump Casinos' Trump Card programs.

As with frequent flyer programs and other types of incentive programs, typical goals of the casino frequent player program include increasing player loyalty, providing incentives to a player to visit the associated casinos as often as possible, and encouraging the player to spend as much money in the associated establishments as possible.

To further improve the effectiveness of player loyalty programs, there is a present and recurring need for new methods to provide incentives to frequent player program members.

SUMMARY OF THE INVENTION

According to one aspect of the invention, a method for conducting an incentive program is provided. The method comprises acts of permitting at least one frequent player program member of the incentive program to submit identification information associated with the at least one frequent player program member, and providing at least one special incentive to the at least one frequent player program member in response to the remote entry of the identification information associated with the at least one frequent player program member. According to one embodiment of the invention, the act of permitting further comprises an act of permitting the user to remotely swipe a membership card identifying the at least one frequent player program member. According to another embodiment, the act of remotely swiping a membership card is performed by the member entering a unique identifier. According to another embodiment, the act of remotely swiping a membership card is performed by the member additionally entering at least one of a password and a passcode.

According to one embodiment of the invention, the at least one special incentive includes at least one of a prize and an award. According to another embodiment, the at least one of a prize and an award is won by a frequent player program member through a sweepstake. According to another embodiment, the member is not informed of a win until the player visits the land-based casino. According to another embodiment, the member must go to the land-based casino to receive the at least one of the prize and the award. According to another embodiment, the member must go to the land-based casino to receive the at least one of the prize and the award within a specified time period. According to another embodiment, the method further comprises an act of providing to the member a unique identifier.

According to one embodiment of the invention, the method further comprises an act of providing to the member at least one of a password and a passcode. According to another embodiment, the act of remotely swiping the membership card is performed by at least one of a video-enable, audio-enabled, and card reader-containing device. According to another embodiment, the device includes at least one of a kiosk, a personal computer, a handheld device, a telephone, and a wireless telephone. According to another embodiment, the at least one of the prize and the award includes at least one of money, a credit, merchandise, and loyalty points. According to another embodiment, the at least one of the prize and the award includes money, and wherein the method further comprises an act of paying out money including an act of providing at least one of cash, a check, a debit card, and an account credit. According to another embodiment, the at least one of the prize and the award includes loyalty points, and the method further comprises an act of paying out loyalty points including providing at least one of a loyalty program credit and an account credit.

According to another aspect of the present invention, a method is provided for conducting a game comprising acts of providing an incentive to a player to return to a gaming establishment, and displaying an indication of the incentive to the player in an interface of a remote computer system. According to one embodiment, the remote computer system is located outside of the gaming establishment. According to another embodiment, the computer system is not part of the gaming establishment.

According to another embodiment, the method further comprises an act of associating the incentive with an identification of the player. According to another embodiment, the identification of the player includes frequent player identification. According to another embodiment, the act of displaying includes an act of displaying the incentive to the player during play of an online game.

According to another embodiment, the act of providing an incentive is performed periodically. According to another embodiment, the method further comprises an act of determining an incentive periodically and displaying an active incentive to the player in the interface of a remote computer system. According to another embodiment, the act of determining an incentive periodically further comprises determining a time period for the active incentive such that the player is motivated to periodically view the interface.

According to one embodiment, the interface includes a browser-based interface. According to another embodiment, the remote computer system is coupled to the gaming establishment via a communication network. According to another embodiment, the communication network includes the Internet. According to another embodiment, the method further comprises an act of requiring the player to return to the gaming establishment to redeem the incentive. According to another embodiment, the method further comprises an act of requiring the player to redeem the incentive within a predetermined time period.

According to one embodiment, the gaming establishment includes a land-based casino. In another embodiment, the association is performed by a computer system of the gaming establishment. According to another embodiment, the method further comprises an act of tracking a winning of the incentive by the player according to the identification of the player. According to another embodiment, the act of tracking includes tracking the winning of the incentive using the frequent player identification. According to another embodiment, the computer system of the gaming establishment includes at least one of a player tracking system, a gaming machine, a kiosk, and a casino management system.

The function and advantage of these and other embodiments of the present invention will be more fully understood from the examples described below. The following examples are intended to illustrate the benefits of the present invention, but do not exemplify the full scope of the invention.

BRIEF DESCRIPTION OF THE DRAWINGS

The accompanying drawings are not intended to be drawn to scale. In the drawings, each identical or nearly identical component that is shown in various figures is represented by a like numeral. For the purpose of clarity, not every component may be labeled in every drawing.

In the drawings.

DETAILED DESCRIPTION

Frequent player programs for land-based casinos require that players visit the land-based casino or affiliated establishment to obtain credit. Therefore, the player must decide to visit the land-based casino based upon the rewards or incentives that the individual may obtain. However, there is no actual additional pull for getting the player to visit the land-based casino.

Additionally, it is appreciated that constantly visiting a land-based casino may be inconvenient for a bettor. However, with the advent of Internet-based betting sites and online casinos, land-based casinos are at a disadvantage to obtaining bettors that can have other betting opportunities that are more readily available.

One aspect of the present invention relates to a method for providing additional incentives to a frequent player program member to encourage them to visit a land-based casino. One implementation combines the ease of using the Internet or other remote communication technologies with the advantages of a frequent player program. More particularly, a frequent player program member may be provided an incentive to return to the casino in a more convenient location to the member (e.g., at home, on a cell phone). This additional incentive, according to one embodiment, may require the member to return to the casino to redeem the incentive. The incentive may, for example, be in the form of a prize, credit, or other incentive that has value to the member.

In one embodiment of the present invention, each frequent player program member has a unique identifier (e.g., an account number or an account name) and a password or passcode. In another embodiment of the present invention, the frequent player program member may be presented with special incentives for remotely swiping his or her frequent player program card (or by remotely entering his or her unique identifier and password) in a manner that the casino's frequent player program recognizes.

The special incentive may be any program that is targeted exclusively to members that remotely swipe or otherwise use their frequent player program cards. The special incentive program may include, for example, extra prizes or rewards that are awarded to frequent player program members when they remotely swipe or otherwise use their frequent player program card. In one embodiment of the invention, the extra prizes or rewards are not provided to the member until he or she visits the land-based casino. In another embodiment of the invention, the member must visit the land-based casino within a specified period of time to obtain the extra prizes or rewards. For instance, the specified time period may be determined to be within a set time period of the membership card being swiped or within a set time period for the special incentive. For example, a player may be required to visit a land-based casino within one week or two months of having swiped his or her membership card. In another example, the player may be required to visit the casino by a set date (e.g., Feb. 28, 2006) when the special incentive expires.

In another embodiment, the player is encouraged to swipe or otherwise use their membership card remotely as frequently as possible. In one example implementation, a system (e.g., system 300) may determine incentives periodically (e.g., daily) which are then displayed to the player. These incentives are displayed to the player as indication of a win in the display of a remote system. Because the incentives are determined in a periodic manner, continued return by the player to the remote system interface is encouraged. For instance, if the period for determining an incentive is once a day, a player will be encouraged to use the remote system to see if they have won any incentive(s). In this way, both return to the casino and the remote interface is encouraged.

In another embodiment of the invention, extra prizes or rewards may be won through a sweepstake. In one example, the frequent player program member may be informed whether they won or lost at the time of entry. Preferably, the member is not informed of their winnings until he or she visits the land-based casino to encourage more members (even losing ones) to visit the land-based casino.

In one implementation, a computer system of a casino may automatically determine when a remote frequent player program member is a winner. Such a result may be automatically authenticated and verified by the computer system. In this instance, the computer system may then notify the member that he or she has won and what the winnings are. Notification of winning to a member may occur, for example, by mail, e-mail, Internet or other network 604, telephone, television, pager, fax, kiosk or any other method. In one implementation, the player may be advised of their winning during play of an online game. For instance, during play of an online game in which winnings are displayed to the player, the game program may be configured to reveal an indication of a win of an incentive. Displaying of the indication may occur, for example, within the game, or the display may occur within play of another game (e.g., a secondary game to the online game).

After a winner is authenticated and verified, the computer system may then notify other members of the win. Additionally, the computer system may display the member's identity and/or payout.

A member may be able to remotely swipe their frequent player program card (or otherwise enter his or her unique identifier and password) using an audio-enabled, video-enabled, or card reader-containing device. For instance, a kiosk, telephone having a display, television, computer or handheld device may be used. However, it should be appreciated that any other entry method may be used (e.g., by entering a member identifier manually into a computer system).

In one embodiment, a computer system may be used to operate most of this remote operation. A computer system may be a single computer that may be a supercomputer, a minicomputer, a mainframe, or a personal computer. A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

Figure 3:
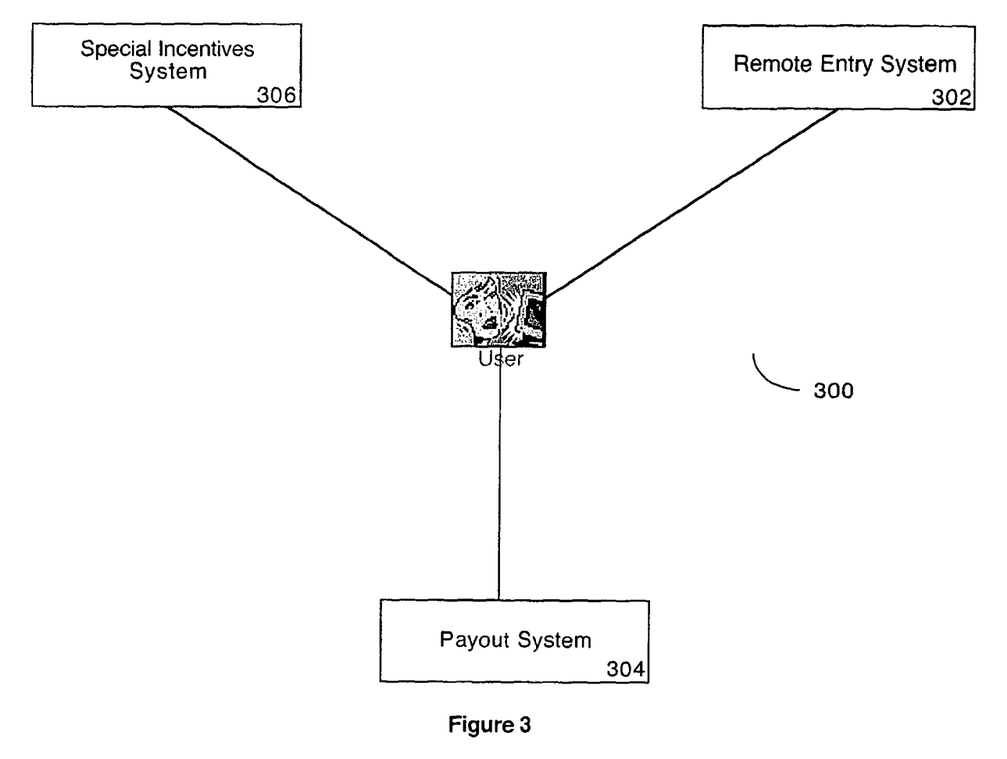
FIG. 3 is a diagram showing example components of a remote special incentives computer system according to one embodiment of the invention.

A computer system (e.g., system 300) that executes game operations according to various embodiments of the invention may include, for example, one or more system components as shown in FIG. 3. One system component may handle remote entry by frequent player program members. Another system component may handle the special incentives and yet another system may handle payouts 620. Such a system may also be connected (e.g., by direct line or network 604) to other computer systems including systems for. handling casino or hotel loyalty programs, reservations, in-room television viewing, gambling floor kiosks, or other systems. Connections to other computer systems may be performed using one or more of the system components described below.

Figure 4:
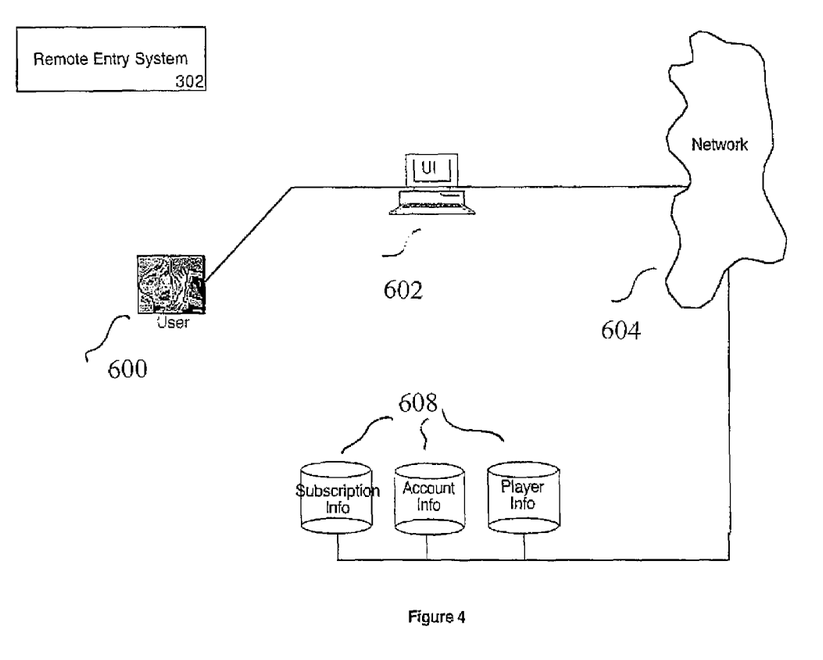
FIG. 4 is a diagram showing components of a remote entry subsystem according to one embodiment of the invention.

A remote entry component (e.g., system 302) may include one or more of a number of well-known systems (e.g., as shown in FIG. 4). For example, a bettor may be able to enter remotely through an off-casino kiosk or other method (e.g., cell phone) is connected to the remote entry computer system through an interface. In the computer, data may be stored in a database that is stored in the memory of a computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network 604. a "user interface " 602 or "UI" is an interface between a human user 600 and a computer that enables communication between a user 600 and a computer. Examples of UIs that may be implemented with various aspects of the invention include a graphical user interface (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Frequent player program member information may also be entered into a remote entry system component (e.g., system 302). Member information that may be input includes name, address, telephone number and age, and payment information may include a credit or debit card number or loyalty account information. Based upon the member information, the call center representative may verify that the member information is accurate.

Various remote entry systems and one or more user interfaces 602 may be located on computer systems coupled by a network 604 with the computer system(s) storing data 608 having member, account, and subscription information. As used herein, a "network" or a "communications network" is a group of two or more devices interconnected by one or more segments of transmission media or active communications equipment on which communications may be exchanged between the devices. One example of a network 604 includes the Internet, at least a portion of which may be used to remotely access incentive information.

The above examples are merely illustrative embodiments of a remote entry system component. It should be appreciated that an illustrative embodiment is not intended to limit the scope of the invention, as any of numerous other implementations of the remote entry system, for example, variations for remote entry method, are possible and are intended to fall within the scope of the invention. For example, the remote entry system may include using pay-per-view systems associated with interactive television in an off-site hotel or the remote entry engine may additionally deliver a receipt to the member by either e-mail or mail. None of the claims set forth below are intended to be limited to any particular implementation of a remote entry system unless such claim includes a limitation explicitly reciting a particular implementation.

Figure 5:
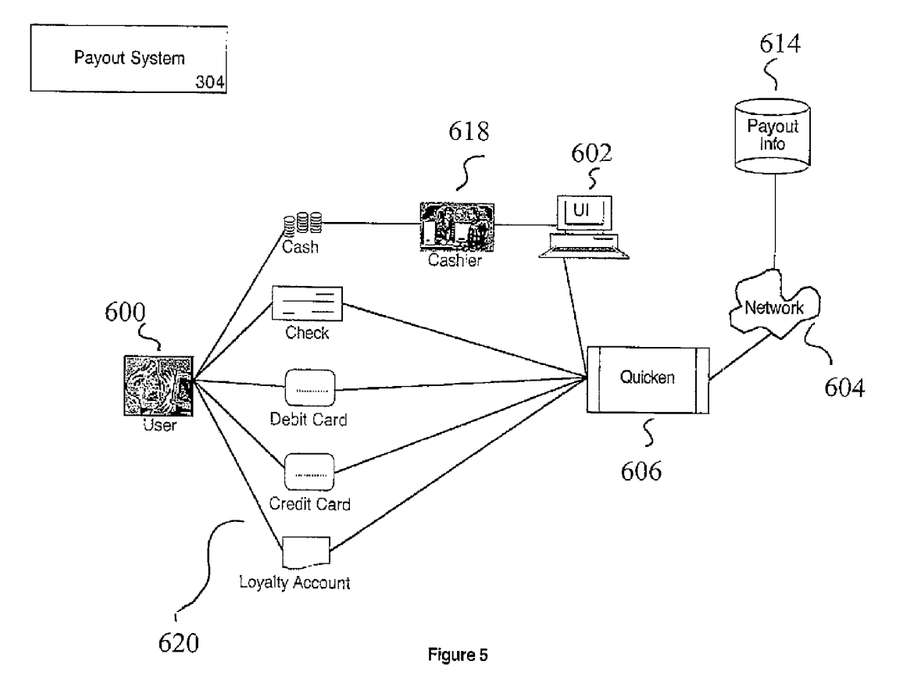
FIG. 5 is a diagram showing components of a payout subsystem according to one embodiment of the invention.

Payout systems are also well known. Any of a number of standard systems or payout 620 engines for making payouts for winning may be used. For example, a standard application programming interface 606 such as 'Quicken' (available commercially from Intuit Inc., Mountain View, Calif., U.S.A.) may be used to write and mail checks or credit a debit card, credit card (if legal in the jurisdiction of play) or loyalty account. 'Quicken' may obtain the payout information 614 by accessing a payout data structure across a network 604.

As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of a payout system. Such an illustrative embodiment is not intended to limit the scope of the invention, as any of numerous other implementations of the payout system, for example, variations of online payout, are possible and are intended to fall within the scope of the invention. Additionally, a cashier 618 may also have access to payout information 614 using a user interface 602 to the payout data structure through a network 604; the cashier 618 then makes a payment to the winning player based upon the accessed information. None of the claims set forth below are intended to be limited to any particular implementation of a pay system unless such claim includes a limitation explicitly reciting a particular implementation.

Figure 6:
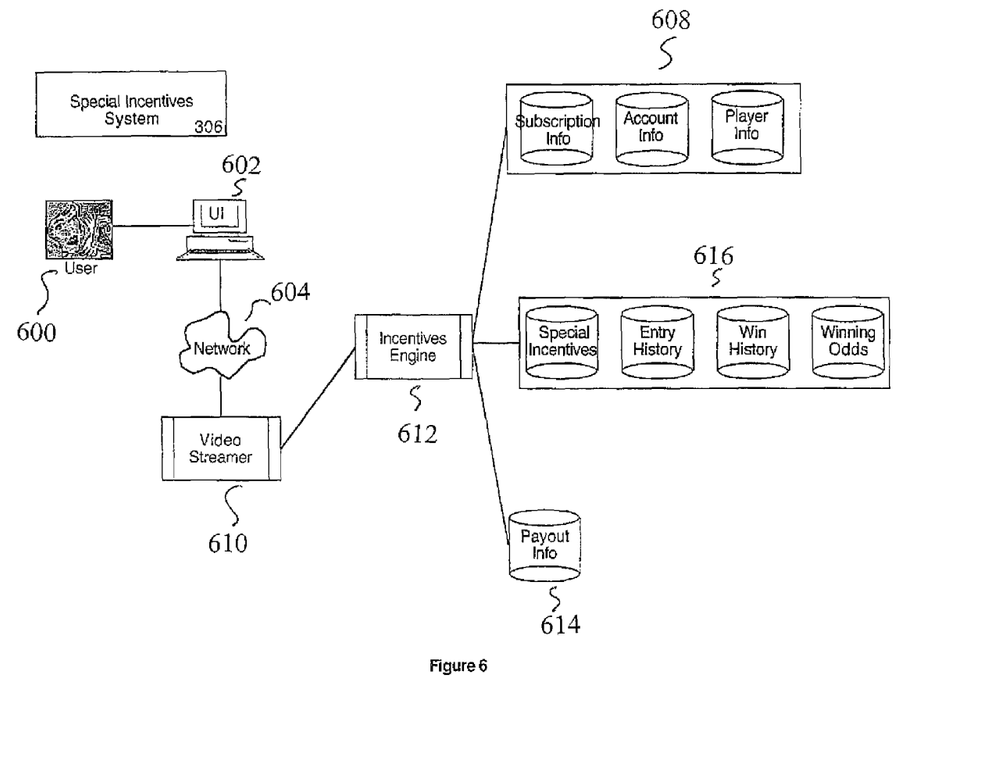
FIG. 6 is a diagram showing components of a special incentives subsystem according to one embodiment of the invention.

A special incentives system (e.g., system 306) according to one embodiment of the invention may comprise of a number of components for performing specific functions as shown in FIG. 6. These components may include, for example, storage means 616 that store data structures having information relating to special incentive programs and odds. For example, such information may include program dates, time, and location, member's betting and win history, and program odds. A remote incentives system may also include components to access remote entry and payout data structures.

A special incentives system, according to one embodiment, may also include an incentives engine 612. An incentives engine 612 may perform, for example, any or all functions required to administer the special incentives program(s) for remote entry frequent player program members. The frequent player program member's winnings of the incentives may be stored and tracked by a computer system of the casino.

In one example, a management system (e.g., a casino management system) may generate incentives and assign them to players. Alternatively, the incentives engine 612 may assign incentive and communicate those assignments to the management system. However, it should be appreciated that there may be many different systems that are capable of generating and/or assigning incentives to a player.

The player's winnings may be displayed on one or more interfaces of one or more systems, including, but not limited to, a game playing computer system on which the player is playing, a player tracking system or casino management system that tracks player wins/losses, or other system (e.g., a player kiosk) that allows different people (casino manager, player, teller, etc.) to view the status of the incentive awards. Such incentives may be tracked by the frequent player identifier or other unique identifier associated with the player.

The processes described above are merely illustrative embodiments of a method for providing special incentives to frequent player program members. Such an illustrative embodiment is not intended to limit the scope of the invention, as any of numerous other implementations for performing the invention. None of the claims set forth below are intended to be limited to any particular implementation of a method of providing special incentives, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 1, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the special incentives system may include a software Component 610 (e.g., a driver) that streams video via a broadband, satellite or wireless medium to a user interface 602. If the remote access is completely automatic, the user interface 602 may be merely a video terminal including television with no user input means. Viewing access may be controlled by standard methods for conditional access including using set top box addresses, telephone numbers or internet protocol (IP) addresses.

The above is merely an illustrative embodiment of a special incentives system. Such an illustrative embodiment is not intended to limit the scope of the invention, as any of numerous other implementations of a special incentives system, for example, variations of conditional access, are possible and are intended to fall within the scope of the invention. None of the claims set forth below are intended to be limited to any particular implementation of a special incentives system unless such claim includes a limitation explicitly reciting a particular implementation.

System 300, and components thereof such as the payment, payout and betting engines, may be implemented using software (e.g., C, C#, C++, Java, or a combination thereof), hardware (e.g., one or more application-specific integrated circuits, processors or other hardware), firmware (e.g., electrically-programmed memory) or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 1 and 2.

System 300 is merely an illustrative embodiment of the remote entry system. Such an illustrative embodiment is not intended to limit the scope of the invention, as any of numerous other implementations of the remote entry system, for example, variations of 300, are possible and are intended to fall within the scope of the invention. For example, interactive television may also be used to view the available bets. None of the claims set forth below are intended to be limited to any particular implementation of the betting system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network 604.

Figure 1:
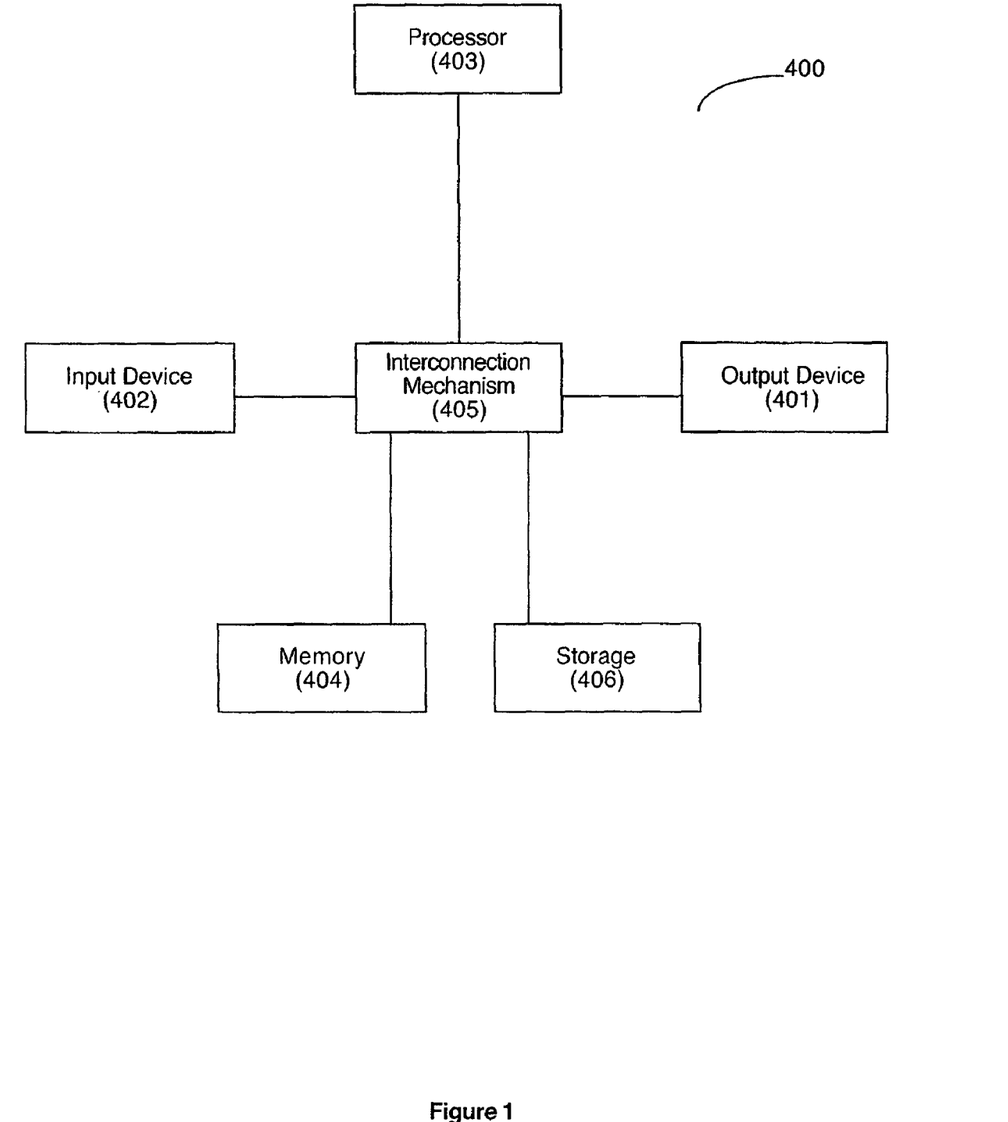
FIG. 1 is a block diagram of a general-purpose computer system upon which various embodiments of the invention may be implemented.

For example, various aspects of the invention may be implemented as specialized software executing in a general-purpose computer system 400 such as that shown in FIG. 1. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network 604 (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, for example, a printing device, display screen, and/or speaker. In addition, computer system 400 may contain one or more interfaces (not shown) that connect computer system 400 to a communication network 604 (in addition or as an alternative to the interconnection mechanism 405.

Figure 2:
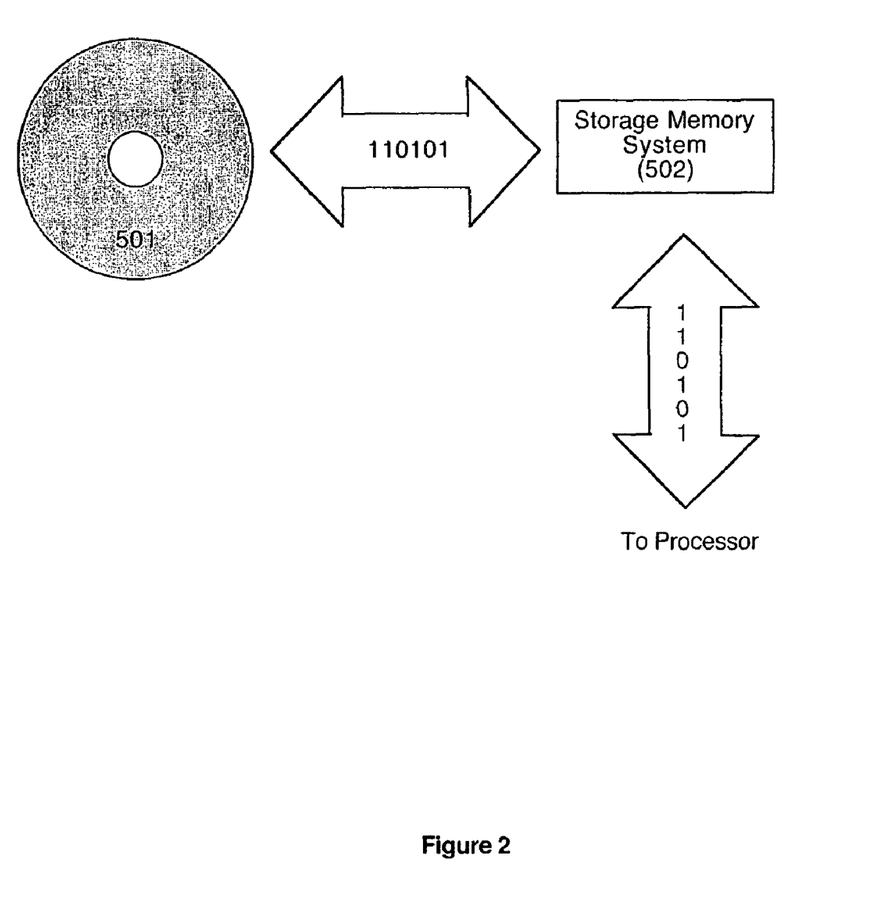
FIG. 2 is a block diagram of a computer data storage system with which various embodiments of the invention may be practiced.

The storage system 406, shown in greater detail in FIG. 2, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architecture or components that that shown in FIG. 1.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network 604. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network 604 (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "containing", "characterized by" and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition $2^{nd}$ Revision, May 2004), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for conducting an incentive program associated with a land-based gaming establishment, the method comprising acts of:
   providing for at least one frequent player program member of the incentive program associated with the land-based gaming establishment to submit identification information associated with the at least one frequent player program member to the gaming establishment utilizing a device located outside the gaming establishment, the device being remotely coupled to the gaming establishment via a communications network;
   providing an indication of at least one special incentive to the at least one frequent player program member on an interface of the device while outside the gaming establishment in response to the remote submission of the identification information associated with the at least one frequent player program member;
   awarding the at least one frequent player program member at least one special incentive responsive to the remote submission, wherein the at least one special incentive is provided as a result of the remote submission and independent of game play; and
   informing the at least one frequent player program member of an award of the at least one special incentive awarded responsive to the remote submission, and not informing the at least one frequent player program member of a value of the at least one special incentive at the time of the remote submission, wherein the at least one frequent player program member is required to be physically present within the gambling establishment to be informed of and to redeem the value of the at least one special incentive.

2. The method according to claim 1, wherein the act of providing for further comprises an act of providing for the at lease one frequent player program member to remotely swipe a membership card identifying the at least one frequent player program member.

3. The method according to claim 2, wherein the act of remotely swiping a membership card is performed by the at least one frequent player program member entering a unique identifier.

4. The method according to claim 3, wherein the act of remotely swiping a membership card is performed by the at lease one frequent player program member additionally entering at least one of a password or a passcode.

5. The method according to claim 2, wherein the act of remotely swiping the membership card is performed by at least one of a video-enabled, audio-enabled, or card reader-containing device.

6. The method according to claim 5, wherein the device includes at least one of a kiosk, a personal computer, a hand-held device, a telephone, or a wireless telephone.

7. The method according to claim 1, wherein the at least one special incentive includes at least one of a prize or an award.

8. The method according to claim 7, wherein the at least one frequent player program member must go to the land-based casino to receive the at least one of the prize or the award within a specified time period.

9. The method according to claim 7, wherein the at least one of the prize or the award includes at least one of money, a credit, merchandise, or loyalty points.

10. The method according to claim 9, wherein the at least one of the prize or the award includes money, and wherein the method further comprises an act of paying out money including an act of providing at least one of cash, a check, a debit card, or an account credit.

11. The method according to claim 9, wherein the at least one of the prize or the award includes loyalty points, and the method further comprises an act of paying out loyalty points including providing at least one of a loyalty program credit or an account credit.

12. The method according to claim 7, wherein the at least one frequent player program member is required to redeem the at least one of the prize or the award at the land-based casino within a predetermined time period.

13. The method according to claim 1, wherein the at least one of a prize or an award is won by the frequent player program member through a sweepstake.

14. The method according to claim 13, wherein the gaming establishment is a land-based casino.

15. The method according to claim 1, further comprising an act of providing at least one frequent player program member a unique identifier.

16. The method according to claim 15, further comprising an act of providing to the at least one frequent player program member at least one of a password or a passcode.

17. A method for conducting a game, the method comprising acts of:

providing an incentive to a player to physically return to a gaming establishment while not informing the player of a value of the incentive;

displaying an indication of the incentive to the player in an interface of a remote computer system in response to the submission of identification information associated with a frequent player program, the remote computer system located outside of the gaming establishment and being coupled to the gaming establishment by a communications network;

providing incentive to the player periodically based on a determined time period, such that the player is motivated to continuously return to the remote interface wherein the incentive is provided as a result of the information submission and independent of game play; and requiring the player to physically return to the gaming establishment to learn the value of and redeem the incentive.

18. The method according to claim 17, further comprising an act of associating the incentive with an identification of the player.

19. The method according to claim 18, wherein the identification of the player includes frequent player identification.

20. The method according to claim 18, wherein the association is performed by a computer system of the gaming establishment.

21. The method according to claim 20, further comprising an act of tracking the providing of the incentive to the player according to the identification of the player.

22. The method according to claim 21, wherein the act of tracking includes tracking the providing of the incentive using the frequent player identification.

23. The method according to claim 20, wherein the computer system of the gaming establishment includes at least one of a player tracking system, a gaming machine, a kiosk, or a casino management system.

24. The method according to claim 17, wherein the act of displaying includes an act of displaying the incentive to the player during play of an online game.

25. The method according to claim 17, wherein the act of providing the incentive is performed periodically.

26. The method according to claim 25, further comprising an act of determining an incentive periodically and displaying an active incentive to the player in the interface of a remote computer system.

27. The method according to claim 17, wherein the interface includes a browser-based interface.

28. The method according to claim 17, wherein the communication network includes the Internet.

29. The method according to claim 17, further comprising an act of requiring the player to redeem the incentive within a predetermined time period.

30. The method according to claim 17, wherein the gaming establishment includes a land-based casino.

31. A method for conducting an incentive program, the method of comprising acts of:

providing for a frequent player program member of an incentive program, the incentive program associated with a land-based casino, to remotely submit identification information associated with the at least one frequent player program member to the land-based casino utilizing a device at a home of the member, the home of the member being outside of the land-based casino;

providing at least one incentive, independent of game play, to travel to the land-based casino to the at least one frequent player program member in response to the remote submission of the identification information associated with the at least one frequent player program member, an indication of the incentive provided to the at least one frequent player program member on an interface of the device while outside the land-based casino, wherein the at least one incentive to travel to the land-based casino is at least one prize provided to at least one frequent player program member, wherein the at least one frequent player is not informed of a value of the at least one prize when receiving the indication of the incentive; and informing the at least one frequent player program member of the value of the at least one prize and allowing the at least one prize to be redeemed only at the land-based casino.

32. The method of claim 31, wherein the remote submission is performed by the member using a device coupled to the gaming establishment via a communication network.

33. The method of claim 31, wherein the incentive is displayed to the player periodically on a display of a remote system.

* * * * *